United States Patent
Holzapfel et al.

(10) Patent No.: US 9,905,344 B2
(45) Date of Patent: Feb. 27, 2018

(54) METHOD FOR PRODUCING A GRAIN-ORIENTATED ELECTRIC STRIP

(75) Inventors: Christof Holzapfel, Gelsenkirchen (DE); Stefan Pahike, Gelsenkirchen (DE); Carsten Schepers, Raesfeld (DE); Heiner Schrapers, Duisburg (DE)

(73) Assignee: ThyssenKrupp Electrical Steel GmbH, Gelsenkirchen (DE)

( * ) Notice: Subject to any disclaimer, the term of this patent is extended or adjusted under 35 U.S.C. 154(b) by 664 days.

(21) Appl. No.: 13/994,446

(22) PCT Filed: Sep. 21, 2011

(86) PCT No.: PCT/EP2011/066423
§ 371 (c)(1),
(2), (4) Date: Sep. 19, 2013

(87) PCT Pub. No.: WO2012/079790
PCT Pub. Date: Jun. 21, 2012

(65) Prior Publication Data
US 2014/0004380 A1    Jan. 2, 2014

(30) Foreign Application Priority Data

Dec. 14, 2010  (DE) .................. 10 2010 054 509

(51) Int. Cl.
*H01F 3/02*   (2006.01)
*C04B 28/34*  (2006.01)
(Continued)

(52) U.S. Cl.
CPC ............. *H01F 3/02* (2013.01); *C04B 28/346* (2013.01); *C21D 8/1283* (2013.01);
(Continued)

(58) Field of Classification Search
None
See application file for complete search history.

(56) References Cited

U.S. PATENT DOCUMENTS 2,753,282 A    7/1956  Perry
2,979,430 A *  4/1961  Keller ................... C23C 22/74
                                                         148/245
(Continued)

FOREIGN PATENT DOCUMENTS

DE    1954216    5/1970
DE    2247269    5/1981
(Continued)

OTHER PUBLICATIONS

International Search Report for PCT/EP2011/066423, dated Dec. 16, 2011.

*Primary Examiner* — Mandy Louie
(74) *Attorney, Agent, or Firm* — Honigman Miller Schwartz and Cohn LLP; Kathryn D. Doyle, Esq.; Jonathan P. O'Brien (57) ABSTRACT

The invention relates to a method for producing a grain-orientated electric steel which is coated with a phosphate layer and in which there is applied to the electric steel a phosphate solution which contains a colloid component and at least one colloid stabilizer (A) and/or at least one pickling inhibitor (B), the phosphate solution containing at least one compound which has chromium in the oxidation stage III (chromium (III) compound).
Grain-orientated electric steel produced with the method according to the invention is distinguished by excellent optical properties and a high tensile stress.

17 Claims, 9 Drawing Sheets

(51) Int. Cl.
*C21D 8/12* (2006.01)
*C23C 22/74* (2006.01)
*H01F 1/147* (2006.01)
*H01F 27/245* (2006.01)
*H01F 41/00* (2006.01)
*C04B 111/00* (2006.01)
*H01F 41/02* (2006.01)

(52) U.S. Cl.
CPC ............ *C21D 8/1288* (2013.01); *C23C 22/74* (2013.01); *H01F 1/14783* (2013.01); *H01F 27/245* (2013.01); *H01F 41/005* (2013.01); *C04B 2111/00517* (2013.01); *C23C 2222/10* (2013.01); *H01F 41/0233* (2013.01); *Y10T 428/12854* (2015.01)

(56) References Cited

U.S. PATENT DOCUMENTS

| | | | | |
|---|---|---|---|---|
| 3,438,799 A * | 4/1969 | Emmerichs | ............... | C09D 5/08 134/41 |
| 3,562,011 A * | 2/1971 | hirst | ............... | C23C 22/74 148/113 |
| 3,720,549 A * | 3/1973 | hirst | ............... | C23C 22/74 148/113 |
| 3,905,907 A * | 9/1975 | Shiga | ............... | C23G 1/02 134/27 |
| 4,169,741 A * | 10/1979 | Lampatzer | ............... | C23C 22/08 148/258 |
| 4,497,850 A * | 2/1985 | Umezono | ............... | G11B 5/722 427/127 |
| 4,664,763 A * | 5/1987 | McMullen | ............... | C25F 5/00 205/711 |
| 5,141,822 A * | 8/1992 | Matsuo | ............... | C23C 22/30 428/623 |
| 5,174,833 A * | 12/1992 | Tanaka | ............... | C21D 8/1283 148/113 |
| 5,852,164 A * | 12/1998 | Akai | ............... | C08G 63/82 524/706 |
| 5,856,379 A * | 1/1999 | Shiratsuchi | ............... | C08K 3/36 428/403 |
| 6,190,780 B1 * | 2/2001 | Shoji | ............... | C09D 5/084 106/14.12 |
| 6,224,657 B1 * | 5/2001 | Myers | ............... | C04B 28/34 106/14.12 |
| 6,899,770 B1 * | 5/2005 | Goodreau | ............... | C09D 5/08 148/246 |
| 2002/0197505 A1 * | 12/2002 | Shigekuni | ............... | C23C 22/10 428/648 |
| 2006/0169363 A1 * | 8/2006 | Sohi | ............... | C09D 5/008 148/243 |
| 2009/0266450 A1 * | 10/2009 | McCormick | ............... | C23C 22/36 148/255 |
| 2011/0039122 A1 | 2/2011 | Holzapfel et al. | | |
| 2011/0236581 A1 * | 9/2011 | Muraki | ............... | C21D 1/70 427/318 |
| 2011/0293841 A1 * | 12/2011 | Rivera | ............... | C09D 5/084 427/372.2 |

FOREIGN PATENT DOCUMENTS

| | | |
|---|---|---|
| EP | 201228 A2 | 11/1986 |
| EP | 0406833 | 3/1994 |
| EP | 995816 A1 | 4/2000 |
| JP | Sho 48-017581 | 5/1973 |
| WO | 2009101129 | 8/2009 |
| WO | WO 2009/101129 | 8/2009 |

* cited by examiner schematical composition of grain-orientated electric steel

Fig.1 insulation solution:

application to the steel / burning in at about 830°C insulation layer:

Metal Phosphates chromium (III) compound (chromium Phosphates)

Colloidal enclosures

Implementation of the phosphate layer (schematically)

Fig.2

Effect of chromium (VI) in the insulation layer

Fig.3

Effect of chromium (VI) in the insulation layer

Fig.4

Effect of Pickling Inhibitor according to
WO 2009/101129

Fig.5

Effect of colloid stabiliser according to
WO 2009/101129

Fig.6

Effect of chromium (VI) on the tensile stress transferred

Fig.7 pickling loss of an insulation without chromium and pickling chromium nitrate

Fig.8

Objective: chromium (VI) free insulation

Fig.9

Effect of chromium (III) nitrate and DETH on the pickling reaction with iron surfaces

Fig.10

Figure 11:
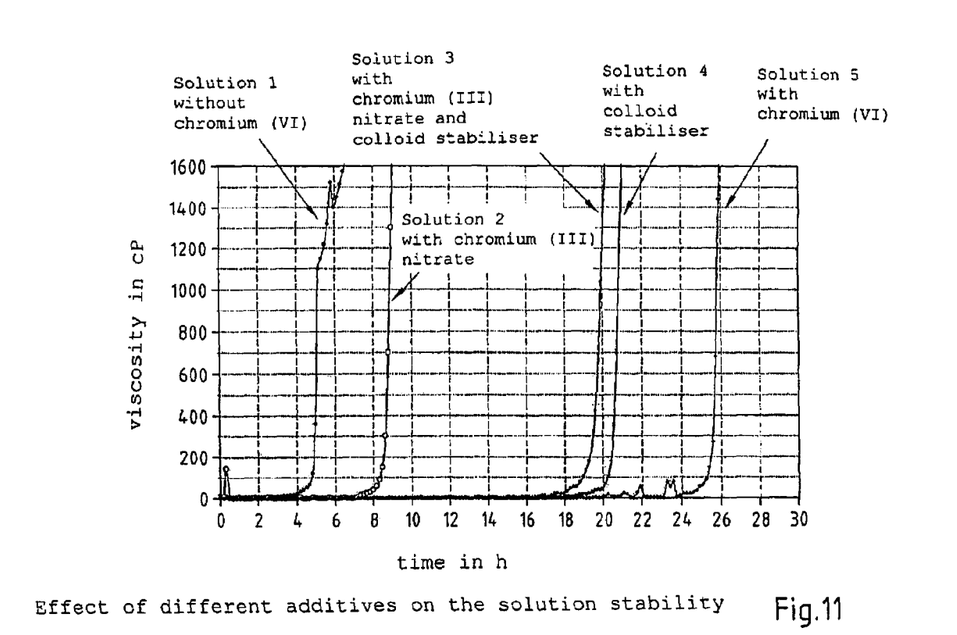

Effect of different additives on the solution stability    Fig.11

Figure 12:
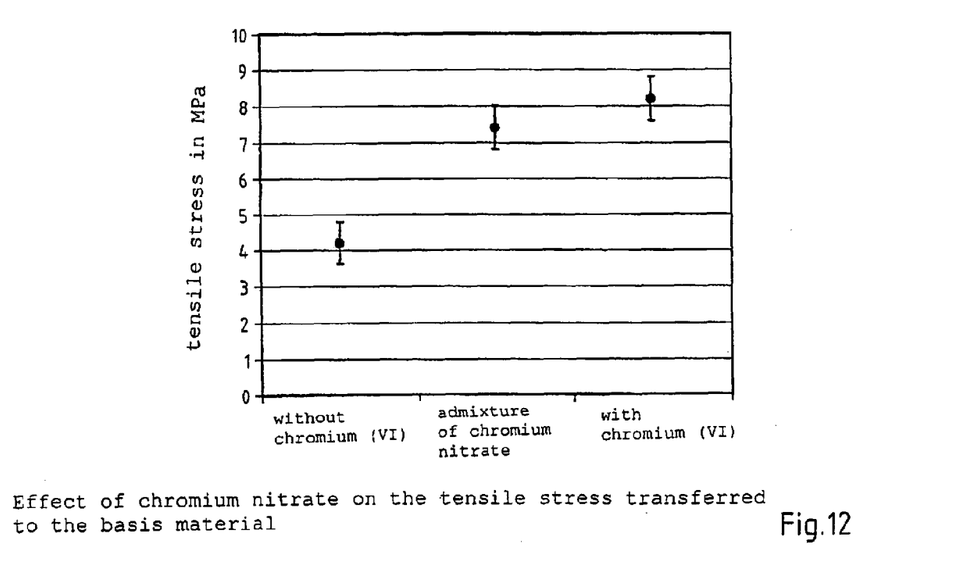

Effect of chromium nitrate on the tensile stress transferred to the basis material    Fig.12

Effect of chromium nitrate on the visual appearance of the steel

Fig.13

Effect of chromium acetate on the tensile stress transferred to the basis material

Fig.14

Effect of chromium chloride on the tensile stress transferred to the basis material

Fig.15

Effect of chromium chloride on the visual appearance of the steel.

Fig.16

Effect of chromium sulphonate on the tensile stress transferred to the basis material

Fig.17

METHOD FOR PRODUCING A GRAIN-ORIENTATED ELECTRIC STRIP

CROSS-REFERENCE TO RELATED APPLICATIONS

This U.S. Application claims the benefit of PCT Application No. PCT/EP2011/066423, filed on Sep. 21, 2011, which claims priority to German Application Serial No. 10 2010 054 509.0 filed Dec. 14, 2010. The entire contents of the aforementioned applications are incorporated herein by reference in their entireties.

The invention relates to a method for producing a grain-orientated electric steel which is coated with a phosphate layer. The invention further relates to a grain-orientated electric steel which is coated with a phosphate layer and which can be produced using the method according to the invention, and the use of this electric steel as a core material in a transformer.

Figure 1:
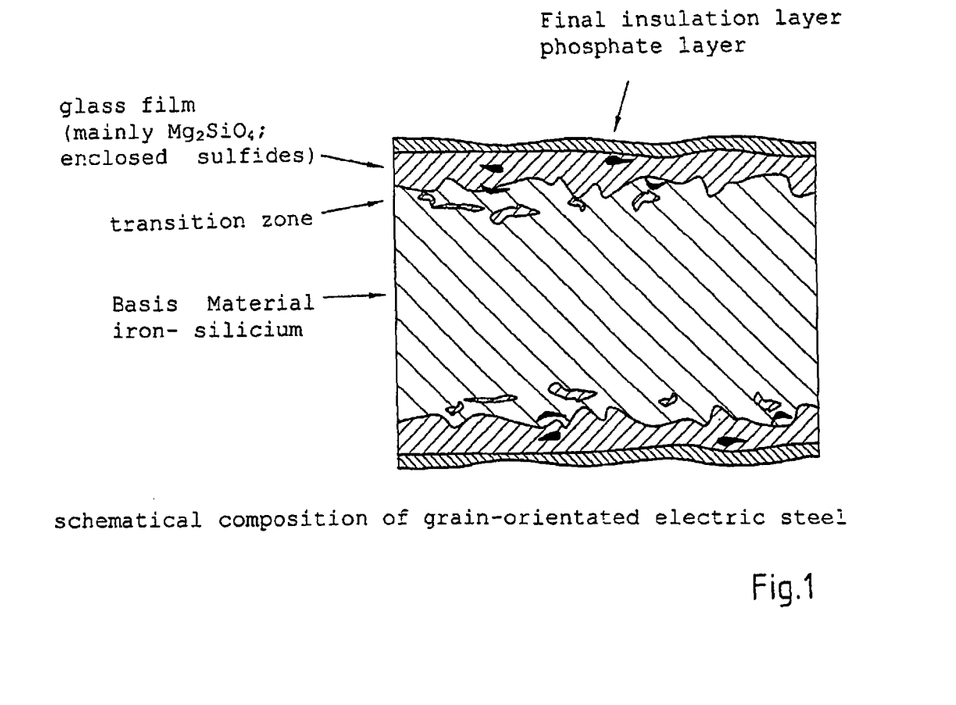

Grain-orientated electric steel (referred to below in brief as GO electric steel) viewed schematically is a ferromagnetic iron material in strip form with thicknesses of approximately from 0.15 mm to 0.50 mm, on the surface of which an electrically insulating layer system is located. The basic structure of the GO electric steel is illustrated in FIG. 1.

With regard to the use of GO electric steel in the transformer, high demands are made on the magnetic properties of the material. These can only be achieved when the crystallographic orientation of the iron material has a specific texture, in which the direction of the easiest magnetisability is located in the rolling direction or with respect to subsequent use in the magnetic field direction. The formation of the texture is achieved by means of selective cold forming with subsequent heat treatments, in which various recrystallisation processes occur. In addition to the texture, that is to say, the crystal orientation, the domain structure typical for ferromagnetic materials also has an influence on the magnetic properties. The domain structure which is dynamically involved in the subsequent magnetism reversal processes, can be modified by means of physical influences in such a manner that the magnetism reversal processes are connected with lower energy losses. A significant physical influence variable in this context is the tensile stress transmitted from the layer system to the ferromagnetic base material. The higher this tensile stress is, the lower the magnetism reversal loss of the material becomes. In this regard, the layer system located on the surface performs a plurality of functions:
a) electrical insulation of the metal base material,
b) transmission of a tensile stress to the metal base material,
c) ensuring chemical and thermal resistance.

In order to achieve these objectives, a "dual-layer system" has been found to be advantageous in practice as a layer system, which comprises the so-called glass film, a ceramic-like layer, and the so-called phosphate layer. In addition to their usual properties, both apply a permanent tensile stress to the base material. The focus of the present invention is the outer phosphate layer, which makes a significant contribution to the chemical and thermal resistance, but also applies a permanent tensile stress to the material which is located therebelow.

Figure 2:
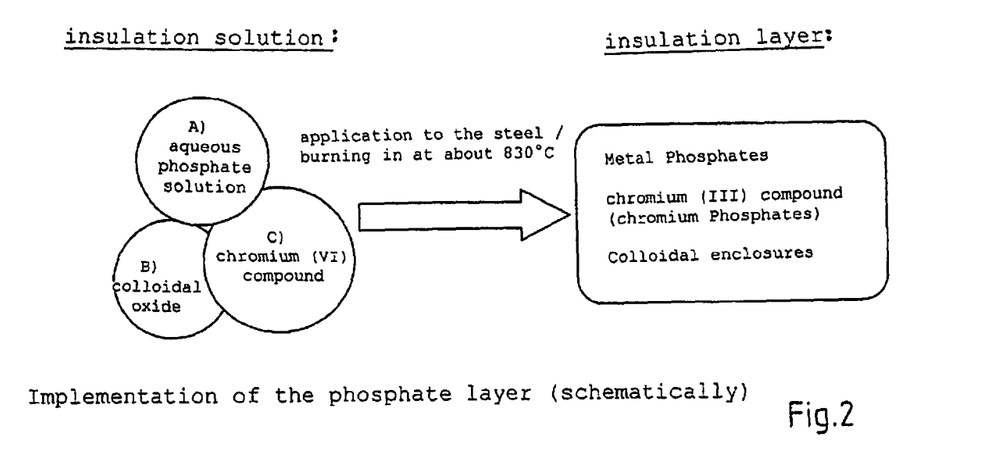

From a plurality of methods and processes proposed, for the phosphate layer a system which corresponds to the one schematically illustrated in FIG. 2 has been found to be advantageous in practice.

An aqueous phosphate solution, substantially comprising
a) one or more primary phosphates which are dissolved in water,
b) one or more colloidal oxide compounds, in particular silica sol,
c) a chromium (VI) compound, in particular chromium trioxide or chromic acid,
is applied to the strip in a defined quantity. The application is carried out in practice by means of excessive application of the solution to the strip with subsequent squeezing out of the excess solution. The solution itself is generally located in a circuit so that there is permanent contact between the insulation solution and the strip surface. The strip coated in this manner passes through a continuous furnace at a temperature of approximately 850° C. The phosphate layer achieved substantially complies with all the relevant practical requirements, in particular
a) good electrically insulating properties,
b) a high chemical resistance,
c) corrosion resistance,
d) high tensile stress transmission,
e) good coatability in practice.

The significance of the composition of the phosphate solution with regard to the layer properties a) to e) are explained, for example, in US 02753282, EP 0406833, DE 1954216, DE 2247269, EP 0201228.

The tensile stress transmitted to the base material is produced primarily by the use of a colloidal oxide compound, with a phosphate binder.

The addition of hexavalent chromium (VI) is intended:
a) to improve the corrosion resistance of the final material,
b) to prevent the dissolution of iron in the solvent state,
c) by means of extremely varied mechanisms, to prevent a degree of adhesion of the completed insulation,
d) to increase the chemical resistance of the layer, in particular against the effects of water,
e) to bind phosphoric acid which is released when the phosphate solution is burnt in to form chromium phosphate.

A significant disadvantage of this method is that chromium (VI) is toxic, carcinogenic and very hazardous to water. In applications of chromium (VI) or chromium-(VI)-containing preparations, considerable operational safety and environmental protection measures are necessary. In principle, the use of chromium (VI) in industrial preparations is repeatedly a topic of discussion.

Attempts to simply omit chromium (VI) from the phosphate solution have previously failed. Owing to the omission of chromium (VI) from the phosphate solution without replacement, the insulation solution in this manner receives other chemical properties in such a manner that application cannot be considered in practice. For example, chemical attack on the basic iron material with chromium (VI) is inhibited. The omission of chromium (VI) leads to a significant chemical reaction between the phosphate solution and the metal, a pickling reaction. In the following experiment, the following phosphate solutions were prepared.

TABLE 1

| Solution component | | without Chromium (VI) | with Chromium (VI) |
|---|---|---|---|
| Monoaluminium phosphate solution 50% | g | 90 | 90 |
| Silica sol 30% | g | 110 | 110 |
| Chromium trioxide | g | | 7 |

By immersing a GO electric steel sample without glass film, the chemical attack of the solution on the basic material can be readily illustrated in the form of the pickling loss. In this instance, the sample is weighed before immersion and after various activity times and the pickling removal is established.

Figure 3:
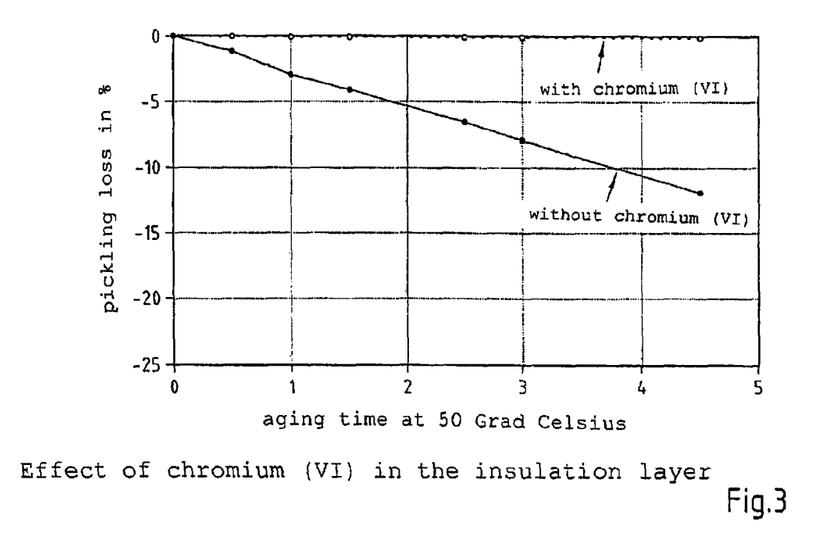

FIG. 3 clearly shows that chromium (VI) inhibits the chemical reaction with the metal base material. Consequently, the insulation solution becomes significantly less contaminated during its application with iron phosphates which have harmful effects in the burnt-in layer. This property is known.

Figure 4:
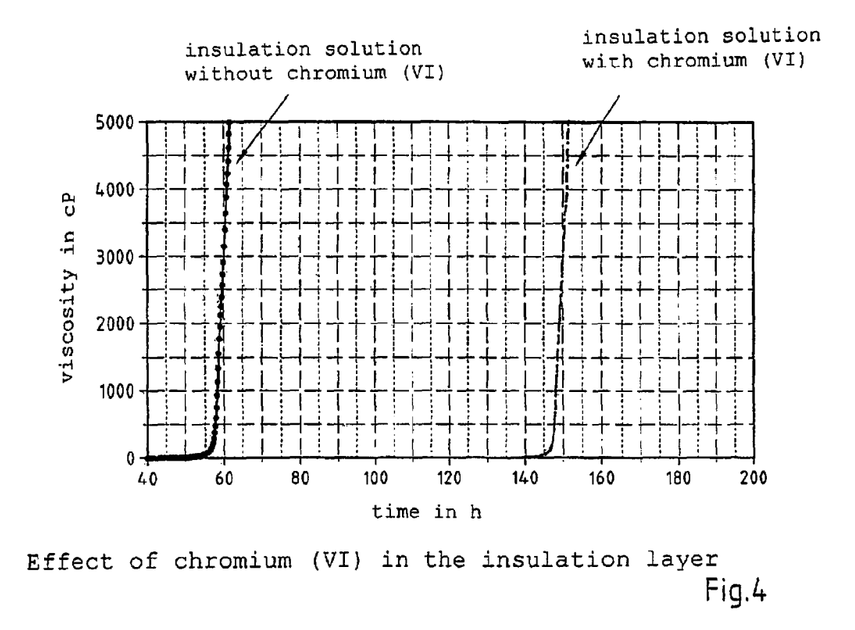

Another solution property which is significant in particular in practice is the so-called solution stability. Owing to the presence of a colloidal component (silica sol), the solution acquires thixotropic properties. A reversible gelation of the solution which is dependent on time, temperature and contaminations takes place. This process is connected to the properties of the burnt-in layer, but must not occur during the use of the solution in a conventional coating device. The stability of the solution can be illustrated by means of an experimental determination of the time path of the viscosity. The gelation leads to an almost abrupt rise of the viscosity. The results of viscosity measurements of the solutions from the above example are set out in FIG. 4.

It can clearly be seen that chromium (VI) delays the time at which the gelation begins. This property of the hexavalent chromium (VI) is not mentioned in the publications set out above, but is decisive in the overall consideration.

In WO 2009/101129, a method is provided by means of which colloidal phosphate solutions can be used successfully in practice without chromium (VI). The method is based substantially on the use of so-called pickling inhibitors and colloid stabilisers, which take on the corresponding functions of chromium (VI).

For example, the following insulation solutions lead to the solution properties set out below.

TABLE 2

| Solution component | | without pickling inhibitor | with pickling inhibitor |
|---|---|---|---|
| Monoaluminium phosphate solution 50% | g | 90 | 90 |
| Silica sol 30% | g | 110 | 110 |
| Diethylthiourea | g | | 0.06 |

Figure 5:
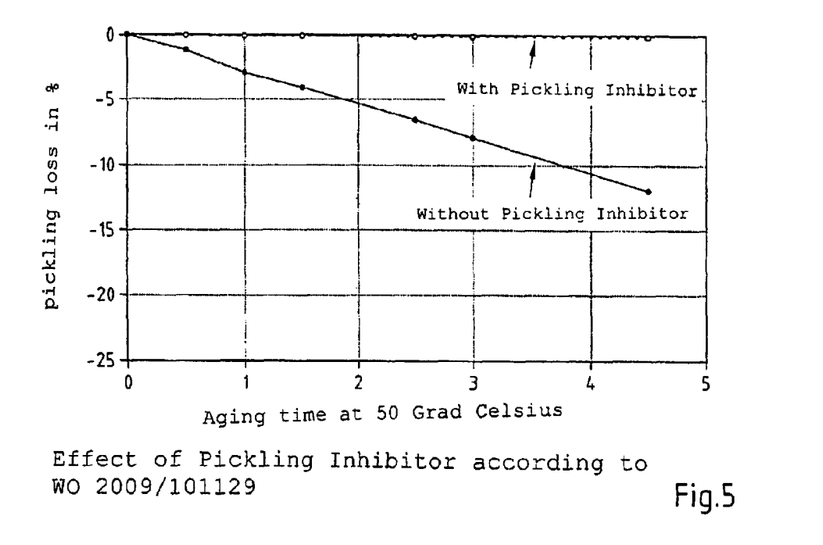

The action of the pickling inhibitor in a method according to WO 2009/101129 is demonstrated in FIG. 5.

Figure 6:
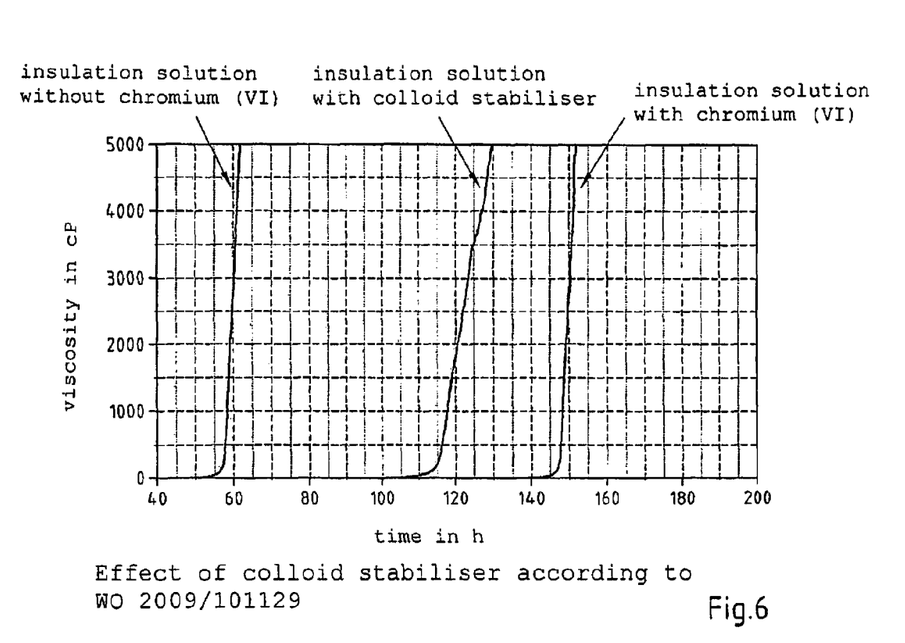

With regard to the colloid stability, so-called colloid stabilisers are mentioned in WO 2009/101129, in particular ethyl phosphate, whose effects are demonstrated in FIG. 6.

On the whole, WO 2009/101129 sets out a method by means of which colloidal phosphate insulation solutions which do not contain any chromium, that is to say, are chromium-free, can be used on GO electric steel.

Figure 7:
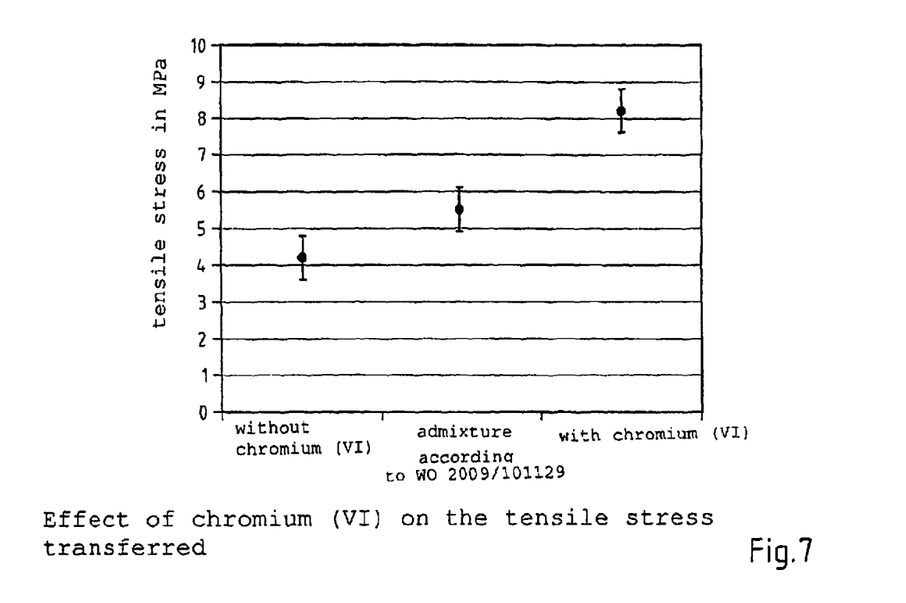

WO 2009/101129 thus provides a chromium-free method which can be very readily used in practice and which already complies in a satisfactory manner with the technological requirements of the GO electric steel insulation. Compared with chromium-(VI)-containing insulation layers, however, the insulation layers produced in accordance with WO 2009/101129 do have slightly impaired optical properties and a slightly lower tensile stress (cf. FIG. 7).

The object according to the invention is to provide a chromium-(VI)-free phosphate solution in order to produce a grain-orientated electric steel which is coated with a phosphate layer, the properties of the phosphate layer being intended to the greatest possible extent to be identical to a chromium-(VI)-containing insulation. In particular, the phosphate layer, compared with a phosphate layer applied according to WO 2009/101129, is intended to have improved optical properties and a higher tensile stress.

This object is achieved by a method for producing a grain-orientated electric steel which is coated with a phosphate layer and in which there is applied to the electric steel a phosphate solution which contains a colloid component and at least one colloid stabiliser (A) and/or at least one pickling inhibitor (B), the phosphate solution additionally containing at least one compound, which has chromium in the oxidation stage III (chromium (III) compound).

The expression "the phosphate solution contains a colloid component" is intended to be understood according to the invention to mean that a proportion of the phosphate solution comprises solid particles or supramolecular aggregates with sizes of from a few nanometers to a few micrometers. Preferably, the size of the colloid component in the phosphate solution is in the range from 5 nm to 1 μm, preferably in the range from 5 nm to 100 nm, and in particular in the range from 10 nm to 100 nm.

The proportion of the colloid component in the phosphate solution may vary. Preferably, the proportion of the colloid component in the phosphate solution is in the range from 5% by weight to 50% by weight, in particular from 5% by weight to 30% by weight. As the colloid component, an extremely wide range of substances can be used. Advantageously, these substances are not intended to be soluble in phosphoric acid.

Good results are achieved in particular with oxides, preferably with $Cr_2O_3$, $ZrO$, $SnO_2$, $V_2O_3$, $Al_2O_3$, $SiO_2$, preferably as aqueous suspensions. Particularly $SiO_2$ is outstandingly suitable. A colloid component which is particularly well suited according to the invention is consequently silica sol. Excellent results are achieved with silica sol which has a proportion of $SiO_2$ in water of from 10 to 50% by weight, preferably from 20 to 40% by weight. Particle sizes which are particularly advantageous for $SiO_2$ are from 5 to 30 nm, preferably from 10 to 20 nm.

In the context of the work to develop a chromium-(VI)-free insulation, it has surprisingly been found that chromium (III) compounds, which are considerably less toxic than chromium (VI) compounds, can take on specific functions of the chromium (VI) compounds. This is surprising in so far as the replacement of chromium (VI) with the considerably less toxic chromium (III) has not become widespread in practice since elementary properties of the solution or the burnt-in insulation layer do not comply with the requirements or make the use in industrial coating systems impossible.

The replacement of chromium (VI) acid with chromium (III) nitrate thus leads to the results set out below.

TABLE 3

| Solution component | | Without chromium | With chromium (III) |
|---|---|---|---|
| Monoaluminium phosphate solution 50% | g | 90 | 90 |
| Silica sol 30% | g | 110 | 110 |
| Chromium (III) nitrate | g | | 24 |

It is assumed that the replacement of chromium (VI) with chromium (III) has previously been unsuccessful since the interaction of the phosphate solution with chromium (III) is clearly different from the one with chromium (VI). The interaction leads to very rapid and disruptive occurrences of contamination of the phosphate solution with iron and furthermore to clearly lower solution stability with very early gelation processes. The very different interaction between the phosphating solution and the steel to be coated can be attributed when chromium (III) is present probably to the binding partners of the chromium (III) salts which are mostly used. In the case of chromium (III) nitrate, the solution will thus take on the characteristic properties of nitric acid solutions. Furthermore, trivalent chromium (III) obviously does not have the inhibiting effect which is associated with the hexavalent chromium (VI) compounds.

Figure 8:
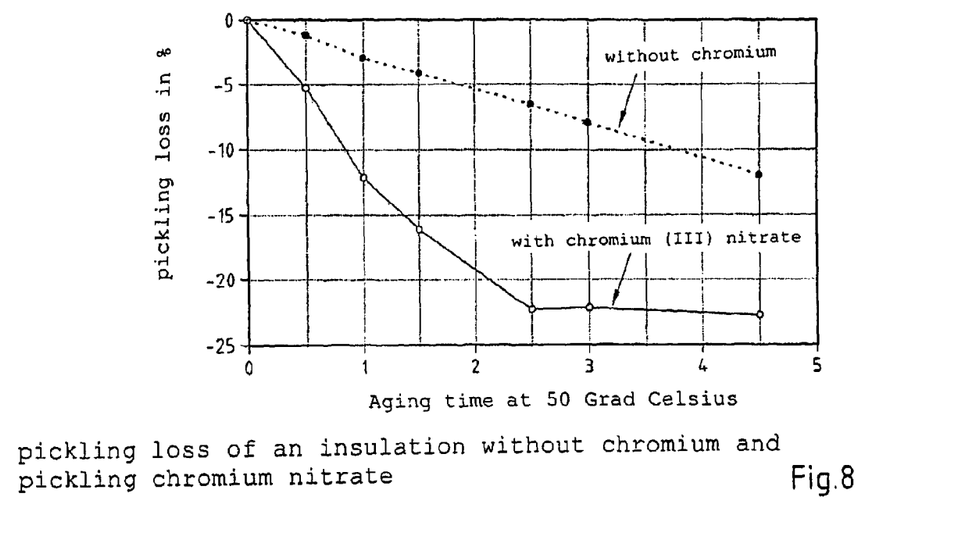

This effect is demonstrated in FIG. 8, which shows the pickling loss of a phosphate solution without chromium and with chromium nitrate.

Figure 9:
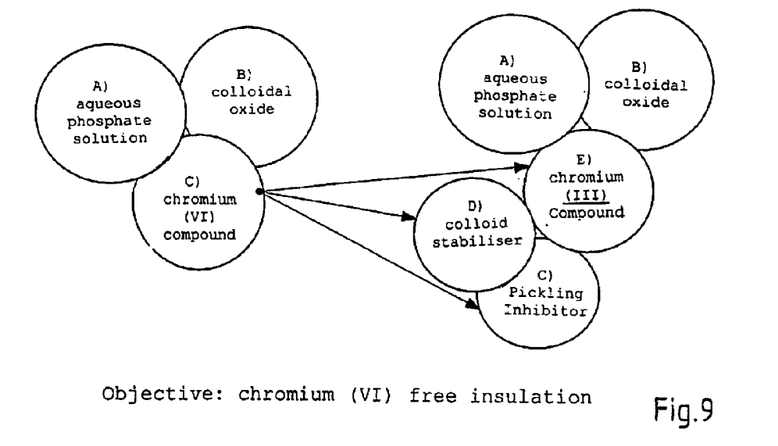

It has surprisingly been found that chromium (III) compounds in an insulation solution according to WO 2009/101129 do not have the above-mentioned disadvantages. The basis of the present invention is therefore the principle illustrated in FIG. 9.

The method according to the invention enables chromium-(VI)-containing phosphating treatments to be replaced with chromium-(III)-containing phosphating treatments which are chemically influenced by the use of pickling inhibitors and colloid stabilisers in such a manner that they can be used in practice and lead to excellent properties of the final insulation layer.

Advantageously, the chromium (III) compounds used in the method according to the invention are soluble in the phosphating solution. Consequently, the following chromium (III) salts are particularly suitable:

Chromium (III) nitrate
Chromium (III) chloride
Chromium (III) sulphate
Chromium (III) acetate
Chromium (III) sulphonate Chromium (III) nitrate is particularly suitable since, acting as an additive, it produces the highest tensile stress transmitted to the base material and can be very readily dissolved in the phosphate solution.

The chromium (III) compound can be used in extremely varied quantities. According to the invention, it is particularly preferable for the chromium (III) compound to be used in a quantity of from 0.2 to 30% by weight, preferably from 5 to 20% by weight, in particular from 8 to 15% by weight, with respect to the overall weight of the phosphate solution in each case. The addition of the chromium (III) compound is preferably carried out in the above-mentioned quantity ratios calculated on the basis of $Cr(NO_3)_3*H_2O$.

In an embodiment of the invention, the phosphate solution contains a colloid stabiliser (A) as an additive. It can thereby be ensured that the transition from sol to gel takes place only when the phosphate layer dries. Furthermore, the use of colloid stabilisers enables homogeneous application of the phosphate solution, whereby homogeneous final layer qualities can be achieved. The use of colloid stabilisers (A) thus enables the use of hexavalent chromium in the phosphate solution to be dispensed with during the phosphating of electric sheet metal, the problems which generally occur during chromium-(VI)-free production using colloid-containing phosphate solutions being able to be avoided to the greatest possible extent.

Additives of the group A are colloid stabilisers. Colloid stabilisers in the context of the invention are additives which stabilise colloids and which prevent uncontrolled sol-gel transition or coagulation of the solid. Advantageously, colloid stabilisers further ensure temperature insensitivity in the region of the application prior to application of the phosphate solution and make the system insensitive with respect to foreign substances, in particular foreign ions.

According to the invention, an extremely wide variety of colloid stabilisers can be used, as long as they are resistant in acid solutions. It is further advantageous for the colloid stabilisers not to impair the stability of the colloid solution and not to have a negative influence on the quality of the phosphate layer applied. It is also advantageous for the colloid stabilisers to have the lowest possible level of toxicity. Furthermore, the colloid stabiliser used is not intended to interact with the other additives which may be present in the phosphate solution in such a manner that the additives are impeded in terms of their individual action.

Practical tests have shown that electrolytes, surfactants and polymers are particularly suitable colloid stabilisers according to the invention. However, the use of phosphoric acid esters and/or phosphonic acid esters as colloid stabilisers is particularly preferred in a surprising manner. The term "phosphoric acid esters" is intended according to the invention to refer to organic esters of phosphoric acid with the formula $OP(OR)_3$, which act as colloid stabilisers. The term "phosphonic acid esters" is intended to refer according to the invention to organic esters of phosphonic acid with the formula $R(OP)P(OR)_2$, which act as colloid stabilisers. In this instance, the residues R may independently of each other be hydrogen, an aromatic or an aliphatic group, not all the residues R being able to be hydrogen at the same time. The term aliphatic group comprises alkyl, alkenyl and alkynyl groups.

Alkyl groups comprise saturated aliphatic hydrocarbon groups which have from 1 to 8 carbon atoms. An alkyl group may be straight-chained or branched. Alkyl groups which are particularly suitable according to the invention are methyl, ethyl, propyl, isopropyl, butyl, isobutyl, sec. butyl, n-pentyl, n-heptyl. An alkyl group may further be substituted with one or more substituents. Suitable substituents are in particular aliphatic residues. Other suitable substituents are alkoxy groups, nitro groups, sulphoxy groups, mercapto groups, sulphonyl groups, sulphinyl groups, halogen, sulphamide groups, carbonylamino groups, alkoxycarbonyl groups, alkoxyalkyl groups, aminocarbonyl groups, aminosulphonyl groups, amino alkyl groups, cyanoalkyl groups, alkylsulphonyl groups, sulphonyl amino groups and hydroxyl groups.

The term alkenyl refers to an aliphatic carbon group which has from 2 to 10 carbon atoms and at least a double bond. An alkenyl group may be present in straight-chained or branched form. Alkenyl groups which are particularly preferred according to the invention are allyl, 2-butenyl and 2-hexinyl. An alkenyl group may optionally be substituted with one or more substituents. Suitable substituents are the ones already mentioned above as alkyl substituents.

The term alkynyl refers to an aliphatic carbon group, which has from 2 to 8 carbon atoms and at least a triple bond. An alkynyl group may be present in straight-chained or branched form. An alkynyl group may also be substituted with one or more substituents. Suitable substituents are the ones already mentioned above as alkyl substituents.

Other suitable substituents for the aliphatic groups are aryl groups, aralkyl groups or cycloaliphatic groups. The term aryl refers to monocyclic groups such as, for example, phenyl, bicyclic groups, such as, for example, indenyl, naphthalenyl, tricyclic groups such as, for example, fluorenyl or a benzo-linked group with three rings. Aryl may also be substituted with one or more substituents. Suitable substituents are the ones already mentioned above for alkyl substituents Aralkyl refers to an alkyl group which is substituted with an aryl group. The term "cycloaliphatic" refers to a saturated or partially unsaturated monocyclic, bicyclic or tricyclic hydrocarbon ring, which is connected with a single bond to the remainder of the molecule. Cycloaliphatic rings are 3 to 8-member monocyclic rings and 8 to 12-member bicyclic rings. A cycloaliphatic group comprises a cycloalkyl group and cycloalkenyl groups. Aralkyl may also be substituted with one or more substituents. Suitable substituents are those already mentioned above as alkyl substituents.

Other suitable substituents for the aliphatic groups are the above-mentioned substituents, in which one or more carbon atoms are substituted by hetero atoms.

Particularly suitable according to the invention is the use of phosphoric acid esters. Particularly suitable are ethyl phosphates, in particular monoethylphosphate and/or diethylphosphate. The product ADACID VP 1225/1 from the company Kebo Chemie is outstandingly suitable.

The method according to the invention consequently enables the use of a chromium-(VI)-free phosphate solution. Of course, the phosphate solution may nonetheless contain chromium. However, the use of a phosphate solution having a content of hexavalent chromium of less than 0.2% by weight, preferably of less than 0.1% by weight, and in particular of less than 0.01% by weight, is preferred.

The phosphate solution may further contain a pickling inhibitor (B), and/or a wetting agent (C). Owing to the use of pickling inhibitors (B) and wetting agents (C), the properties of the grain-orientated electric steel produced using the method according to the invention may be further improved.

Additives which belong to the group B are pickling inhibitors. The term "pickling inhibitors" is intended according to the invention to refer to additives which influence the chemical interaction of the phosphate solution with the steel surface in such a manner that no or only small quantities of iron are dissolved. Owing to the use of pickling inhibitors, a contamination of the phosphate solution with iron ions is consequently prevented and the phosphate solution has properties which are constant over a long period of time. This procedure is advantageous since an enrichment of the phosphate solution with iron reduces the chemical resistance of the phosphate layer on the electric steel. It has been found to be particularly advantageous to use pickling inhibitors in a colloid system, as used according to the invention since the sol-gel transition is heavily dependent on foreign ions. Owing to the addition of pickling inhibitors, the stability of the colloid system can consequently be substantially improved.

According to the invention, an extremely wide range of additives can be used as pickling inhibitors (B) as long as they are resistant in acid solutions. It is further advantageous when the pickling inhibitor does not have a negative influence on the quality of the phosphate layer applied. It is further advantageous for the pickling inhibitor to have the lowest possible level of toxicity. In principle, the pickling inhibitors used are intended to be adapted to the phosphate solution used. Furthermore, the pickling inhibitors used are intended not to have a negative effect on the stability of the colloid components. Furthermore, the pickling inhibitor used is intended not to interact with the additional additives in the phosphate solution in such a manner that the additives are impeded in terms of their individual action.

Practical tests have shown that thiourea derivatives, $C_{2-10}$-alkynols, triazine derivatives, thioglycolic acid, $C_{1-4}$-alkylamines, hydroxy-$C$-$_{2-8}$-thiocarboxylic acid and/or fatty alcohol polyglycol ethers are particularly effective pickling inhibitors.

Pickling inhibitors in the form of thiourea derivatives are intended according to the invention to be understood to be pickling inhibitors which have the thiourea structure as a basic structure. From 1 to 4 hydrogen atoms of the thiourea may be replaced by means of suitable substituents. Substituents which are particularly suitable according to the invention are aliphatic groups as already defined above.

Other suitable substituents on the nitrogen atoms of the thiourea basic structure are aryl groups, aralkyl groups or cycloaliphatic groups, as defined above.

A thiourea derivative which is particularly suitable according to the invention is $C_{1-6}$ dialkylthiourea, preferably $C_{1-4}$ dialkylthiourea. Preferably, the alkyl substituents are present in the unsubstituted state. The use of diethylthiourea, in particular 1,3-diethyl-2-thiourea is quite particularly preferred. The product Ferropas 7578 from the company Alufinish is quite particularly preferred.

Pickling inhibitors which are also particularly suitable according to the invention are $C_{2-10}$-alkynols, in particular $C_{2-6}$-alkynediols, alkyne having the above-mentioned meaning. In $C_{2-6}$-alkynediols which are particularly suitable according to the invention, the alkyne substituents are unsubstituted and have a double bond. Even more preferred according to the invention is butin-1,4-diol, in particular but-2-in-1,4-diol and prop-2-in-1-ol.

Pickling inhibitors which are also very suitable according to the invention are triazine derivatives. A pickling inhibitor in the form of a triazine derivative is intended according to the invention to be a pickling inhibitor which contains the triazine base structure. In the triazine derivatives which are suitable according to the invention, one or more hydrogen atoms of the triazine base structure may be substituted by means of suitable substituents. Suitable substituents are those already mentioned above for alkyl substituents.

Other pickling inhibitors which are particularly suitable according to the invention are fatty alcohol polyglycol ethers. Fatty alcohol polyglycol ethers are intended according to the invention to be understood to be the reaction product of fatty alcohols with an excess of ethylene oxide. Fatty alcohols which are particularly suitable according to the invention have from 6 to 30, preferably from 8 to 15 carbon atoms. The proportion of ethylene oxide groups in the polyglycol ether is preferably high enough to make the fatty alcohol polyglycol ether water-soluble. Accordingly, there should preferably be at least as many —O—$CH_2$—$CH_2$-groups in the molecule as carbon atoms in the alcohol. Alternatively, the water solubility may also be achieved by means of suitable substitution, such as, for example, esterification with sulphuric acid and transferring the ester into the sodium salt. In principle, the hydrogen atoms in the fatty alcohol polyglycol ethers may also be substituted with suitable substituents. Suitable substituents are the substituents already mentioned above for alkyl groups.

Thioglycolic acid and hexamethylenetetramine are further outstandingly suitable for use as pickling inhibitors.

Additives of the C group are wetting agents. In the method according to the invention, an extremely wide range of wetting agents can be used, as long as they are resistant in acid solutions. It is further advantageous when the wetting agents do not have a negative influence on the quality of the applied phosphate layer. It is further advantageous when the wetting agents have the lowest possible level of toxicity.

Furthermore, the wetting agents used are not intended to have a negative influence on the stability of the colloid components. Furthermore, the wetting agent used is not intended to interact with the other additives present in the phosphate solution in such a manner that the additives are impeded in terms of their individual action.

The use of wetting agents in the method according to the invention leads to the application of the phosphate solution to the strip surface being improved. Furthermore, the homogeneity of the phosphate layer increases. Practical tests have shown that fluorosurfactants are outstandingly suitable as wetting agents. An advantage of fluorosurfactants is that they can be used in a stable manner in extremely varied phosphate solutions, even in Cr-(VI)-containing phosphate solutions. For the method according to the invention, extremely varied fluorosurfactants are suitable as an additive. The term fluorosurfactant is intended according to the invention to refer to a surfactant which has a perfluoroalkyl residue as a hydrophobic group, alkyl having the above-defined meaning. Fluorosurfactants are distinguished with respect to non-fluorinated surfactants in that in extremely small concentrations, they already bring about a substantial reduction of the surface tension of the water. Fluorosurfactants further have a high level of chemical and thermal stability. A surfactant component of the fluorosurfactant which can preferably be used according to the invention may include an extremely wide variety of surfactants as long as they are resistant in acid solutions. It is further advantageous for the fluorosurfactants not to disrupt the stability of the colloid solution and not to have a negative effect on the quality of the phosphate layer applied. It is further advantageous for the fluorosurfactants to have the lowest possible level of toxicity.

Practical tests have shown that $C_{1-4}$-tetraalkyl ammonium perfluoro-$C_{5-10}$-alkylsulphonates are particularly suitable fluorosurfactants according to the invention. A particularly suitable wetting agent is the product NC 709 from the company Schwenk which contains tetraethyl ammonium perfluorooctane sulphonate.

The quantities in which the various additives A to C are contained in the phosphate solution can be varied in a wide range. Practical tests have shown that particularly good results are achieved when the colloid stabiliser (A) is used in a quantity of from 0.001 to 20% by weight, preferably in a quantity of from 0.01 to 10% by weight and in particular in a quantity of from 0.1 to 2% by weight. The pickling inhibitor (B) is advantageously used in a quantity of from 0.001 to 10% by weight, preferably in a quantity of from 0.005 to 1% by weight and in particular in a quantity of from 0.01 to 0.08% by weight. The wetting agent (C) is advantageously used in a quantity of from 0.0001 to 5% by weight, preferably in a quantity of from 0.001 to 1% by weight and in particular in a quantity of from 0.01 to 0.1% by weight, each with respect to the overall weight of the phosphate solution.

The phosphate solution according to the invention may contain an extremely wide variety of phosphates. Thus, the phosphate solution may, for example, contain calcium phosphate, magnesium phosphate, manganese phosphate and/or admixtures thereof. Owing to the good water solubility thereof, primary phosphates (monophosphates) are particularly preferred according to the invention. Particularly good results are achieved with a phosphate solution which contains aluminium and/or magnesium phosphate. Quite particularly preferred are phosphate solutions which contain $Al(H_2PO_4)_3$, in particular in a quantity of from 40 to 60% by weight.

If a phosphate solution is used which contains $Al(H_2PO_4)_3$ as a phosphate and $SiO_2$ (silica sol) as a colloid component, the following quantity relationship has been found to be particularly suitable:

$0.5 < Al(H_2PO_4)_3 : SiO_2 < 20$, preferably $0.7 < Al(H_2PO_4)_3 : SiO_2 < 5$ and in particular $Al(H_2PO_4)_3 : SiO_2 = 1.36$.

The basis for the phosphate solution is preferably water; however, it is of course also possible to use other solvents as long as they have a similar reactivity and polarity to water.

According to the invention, the concentration of the phosphate in the phosphate solution is preferably from 5 to 90% by weight, preferably from 20 to 80% by weight, even more preferably from 30 to 70% by weight and in particular from 40 to 60% by weight.

In practice, a burning-in phosphating operation has been found to be particularly suitable in the context of the stress-relieving annealing operation for forming the phosphate layer on the electric steel. In the burning-in phosphating operation, the phosphate solution is first applied to the steel and subsequently burnt-in at temperatures greater than 700° C., preferably more than 800° C., in particular approximately 850° C. Burning-in in a continuous furnace has been found to be particularly advantageous.

As already explained above, the phosphate solution contains a colloid component. This embodiment is advantageous since tensile stress can be transmitted with the colloid component to the electric steel when the phosphate layer is dried. The tensile stress leads to a substantial reduction of the magnetisation reversal losses when the electric steel is used. Furthermore, the magnetostriction and consequently the appearance of noise development when used in transformers can be minimised.

A colloid component which is particularly suitable according to the invention is colloidal silicon dioxide. With regard to the stability of the colloid system, in addition to the use of a colloid stabiliser, the pH value of the phosphate solution is important. In order to increase the stability of the phosphate solution prior to the drying, pH values of <3, preferably of from 0.5 to 1, have been found to be particularly advantageous.

A further increase of the tensile stress on the electric steel may be brought about by a glass film being applied between the phosphate layer and the electric steel. The term glass film is intended according to the invention to refer to a layer which is similar to a ceramic material and which preferably contains primarily $Mg_2SiO_4$ and incorporated sulphides. The glass film is preferably formed in a manner known per se during the full annealing operation from magnesium oxide and silicon oxide.

The phosphate layer and glass film which may be present may be arranged at the upper and/or lower side of the electric steel. Preferably, the phosphate layer and glass film are arranged at the upper and lower side of the electric steel.

The grain-orientated electric steel according to the invention is suitable for an extremely wide variety of applications. A use of the grain-orientated electric steel according to the invention which may be given particular consideration is the use as a core material in a transformer.

The invention is explained in greater detail below with reference to a plurality of embodiments.

Example 1: Effect of Chromium Nitrate in the Phosphate Solution on the Chemical Interaction The following phosphate solutions were prepared.

TABLE 4

| Solution component | | Without chromium | With chromium (III) nitrate | With chromium (III) nitrate and DETH |
|---|---|---|---|---|
| Monoaluminium phosphate solution 50% | g | 90 | 90 | 90 |
| Silica sol 30% | g | 110 | 110 | 110 |
| Diethylthiourea | g | | | 0.06 |
| Chromium (III) nitrate | g | | 24 | 24 |

Phosphate/silica sol admixtures without Cr (VI) and without pickling inhibitor according to WO 2009/101129 show a clearly marked interaction with free iron surfaces. Owing to the addition of chromium (III) nitrate, an again clearly increased interaction is produced. The combination of the additives chromium (III) nitrate and diethylthiourea (DETH) leads to a clear inhibition of the chemical interaction.

The inhibition of the chemical interaction enables use in industrial coating plants since the contamination of the phosphating solution with iron ions is prevented.

Figure 10:
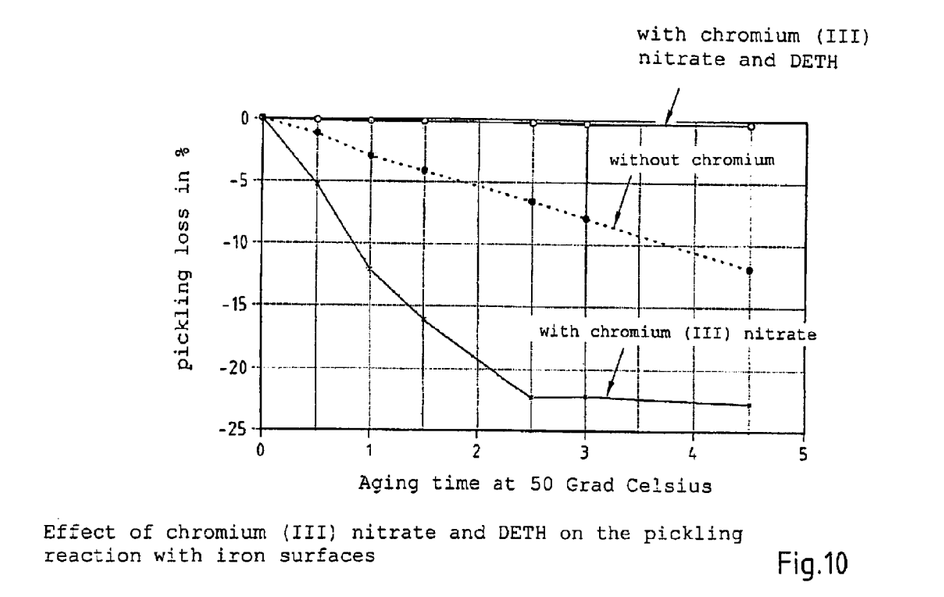

FIG. 10 illustrates the effect of Cr (III) nitrate and DETH on the pickling reaction with iron surfaces.

Example 2: Effect of Chromium Nitrate in the Insulation Solution According to the Invention on the Colloid Stability In order to clarify the advantages according to the present invention, the following phosphate solutions were prepared.

TABLE 5

| Solution component | | Solutions | | | | |
|---|---|---|---|---|---|---|
| | | 1 | 2 | 3 | 4 | 5 |
| Monoaluminium phosphate solution 50% | g | 150 | 150 | 150 | 150 | 150 |
| Silica sol 30% | g | 183 | 183 | 183 | 183 | 183 |
| Water | g | 22.5 | 10 | 12.5 | | 22.5 |
| Chromium trioxide | g | | | | | 7.7 |
| Diethylthiourea | g | | 0.1 | | 0.1 | |
| Ethylphosphate | g | | 12.5 | | 12.5 | |
| Chromium (III) nitrate | g | | | 40 | 40 | |

The insulation solutions were subjected to a measurement of the time development of the viscosity at 50° C. FIG. 11 shows the results.

The insulation solution with chromium (VI) has very good solution stability. The omission of the chromium (VI) compound without any replacement (solution 1) leads to a drastic impairment of the solution stability, which makes use in industrial production processes impossible. The replacement of chromium (VI) with chromium (III) also leads to an impairment of the solution stability. Such solutions are as unsuitable in practice as the solution 1. However, if chromium (III) is used in a solution which contains a colloid stabiliser (A), the solution stability is retained. Such solutions are suitable for industrial production processes.

Example 3: Effect of Chromium Nitrate in the Phosphate Solution on the Tensile Stress Owing to the burnt-in insulation layer, a tensile stress is intended to be transmitted to the ferromagnetic base material and is intended to have a positive influence on the domain structure and further lowers the magnetisation reversal loss.

In order to demonstrate the advantages of the insulation solution according to the invention, the following solutions were prepared.

TABLE 6

| Solution component | | Solutions | | |
|---|---|---|---|---|
| | | 1 | 2 | 3 |
| Monoaluminium phosphate solution 50% | g | 150 | 150 | 150 |
| Silica sol 30% | g | 183 | 183 | 183 |
| Water | g | 40 | 40 | 14 |
| Diethylthiourea | g | 0.1 | 0.1 | |
| Ethylphosphate | g | 12.5 | 12.5 | |
| Chromium (III) nitrate | g | | 40 | |
| Chromium (VI) oxide | g | | | 14 |

The solutions were applied to GO electric steel samples of the size 305 mm×60 mm and burnt-in at 850° C. for 2 minutes. The layer application in the burnt-in state was in all cases 3.5 g/m². Subsequently, the tensile stress test was carried out. FIG. 12 summarises the results.

Example 4: Influence of Chromium (III) Nitrate in the Phosphate Solution on the Layer Appearance The following phosphate solutions were prepared.

TABLE 7

| Solution component | | According to the invention 1 | WO 2009/ 101129 2 |
|---|---|---|---|
| Monoaluminium phosphate solution 50% | g | 150 | 150 |
| Silica sol 30% | g | 183 | 183 |
| Water | g | 40 | 40 |
| Diethylthiourea | g | 0.1 | 0.1 |
| Ethylphosphate | g | 12.5 | 12.5 |
| Chromium (III) nitrate | g | 40 | |

Figure 13:
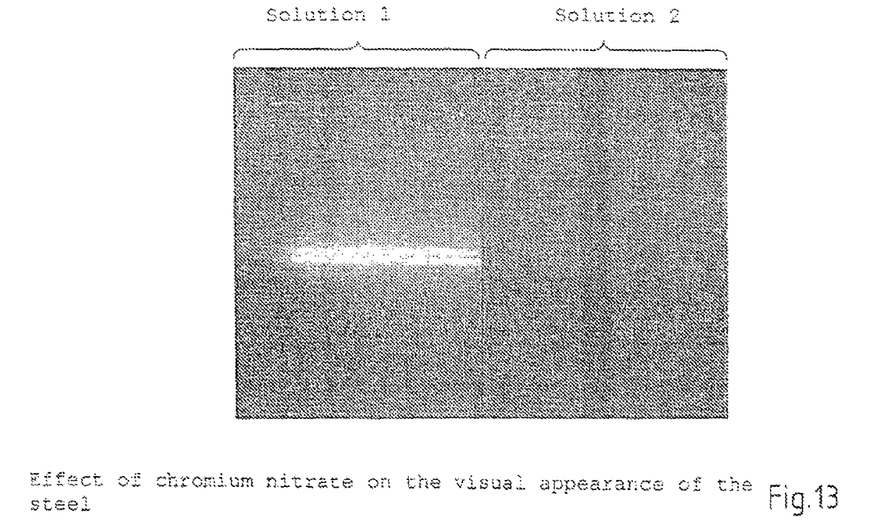

The solutions were applied to GO electric steel samples with glass film and burnt-in for approximately 2 minutes at 850° C. The layer appearance was subsequently evaluated (cf. FIG. 13).

The layer appearance of the insulation according to the invention clearly shows more brilliance than that according to WO 2009/101129. The layer appearance of the insulation according to the invention can no longer be differentiated from an insulation which was produced using hexavalent chromium (VI).

Example 5: Effect of Chromium Acetate in the Phosphate Solution on the Tensile Stress Owing to the burnt-in insulation layer, a tensile stress is intended to be transmitted to the ferromagnetic base material, and is intended to have a positive effect on the domain structure and further lowers the magnetisation reversal loss.

In order to demonstrate the advantages of the phosphate solution used in the method according to the invention, the following solutions were prepared.

TABLE 8

| Solution component | | Solutions | | |
| --- | --- | --- | --- | --- |
| | | 1 | 2 | 3 |
| Monoaluminium phosphate solution 50% | g | 150 | 150 | 150 |
| Silica sol 30% | g | 183 | 183 | 183 |
| Water | g | 40 | 40 | 14 |
| Diethylthiourea | g | 0.1 | 0.1 | |
| Ethyl phosphate | g | 12.5 | 12.5 | |
| ChromdlO-Acetate | g | | 15 | |
| Chromium (VI) oxide | g | | | 14 |

Figure 14:
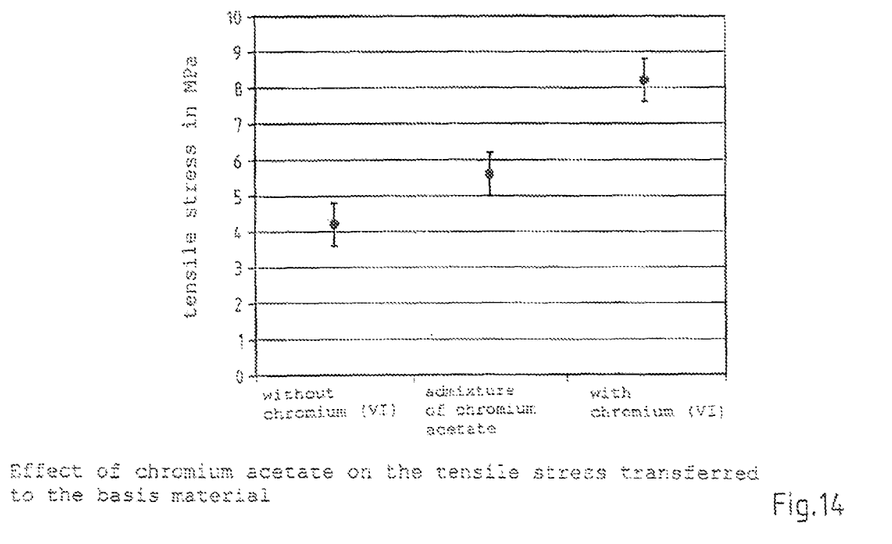

The solutions were applied to GO electric steel samples of the size 305 mm×60 mm and burnt-in at 850° C. for 2 minutes. The layer application in the burnt-in state was in all cases 3.5 g/m². Subsequently, the tensile stress test was carried out. FIG. 14 summarises the results.

Using chromium (III) acetate, the tensile stress transmitted to the base material is influenced in a positive manner with respect to the chromium-free insulation but the effect is substantially less pronounced than that of chromium (VI).

Example 6: Effect of Chromium Chloride in the Insulation Solution According to the Invention on the Tensile Stress In order to demonstrate the advantages of the phosphate solution used in the method according to the invention, the following solutions were prepared.

TABLE 9

| Solution component | | Reference 1 | According to the invention 2 |
| --- | --- | --- | --- |
| Monoaluminium phosphate solution 50% | g | 150 | 150 |
| Silica sol 30% | g | 183 | 183 |
| Water | g | 40 | 40 |
| Diethylthiourea | g | 0.1 | 0.1 |
| Ethyl phosphate | g | 12.5 | 12.5 |
| Chromium (III) Chlond | g | | 80 |

Figure 15:
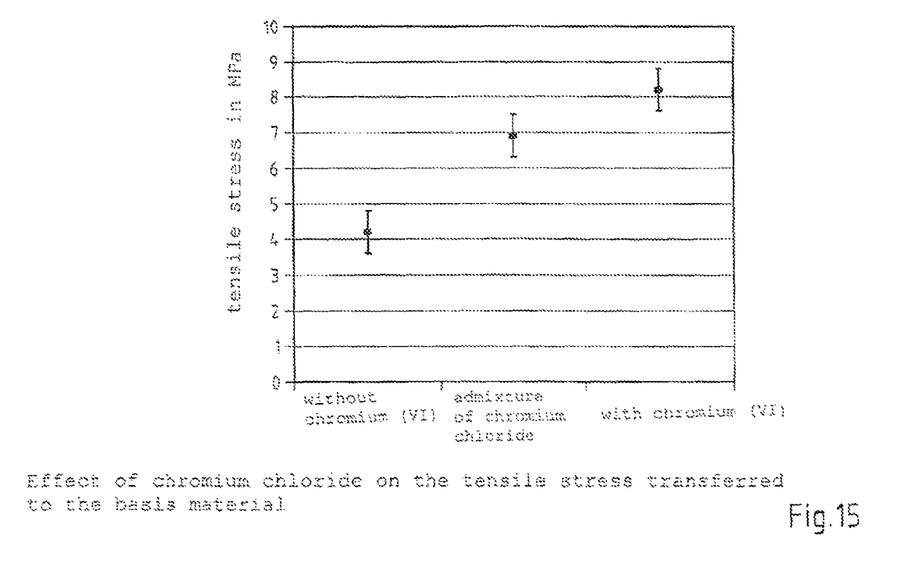

The solutions were applied to GO electric steel samples of the size 305 mm×60 mm and burnt-in at 850° C. for 2 minutes. The layer application in the annealed state was in all cases 3.5 g/m². Subsequently, the tensile stress test was carried out. FIG. 15 summarises the results.

Figure 16:
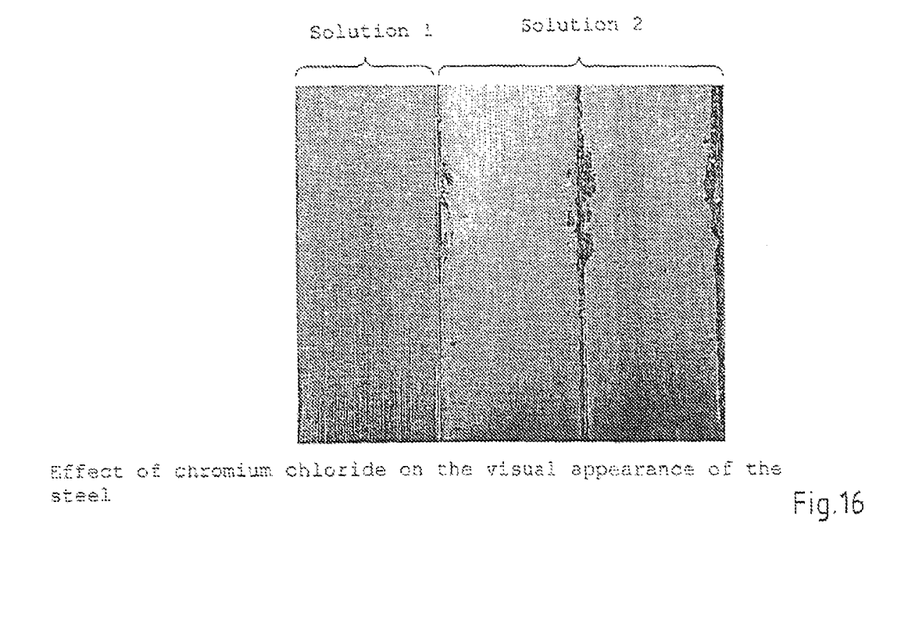

From the chromium (III) chloride, there is obviously the same effect on the layer appearance as with chromium (III) nitrate and hexavalent chromium (VI) (cf. FIG. 16). However, when chromium (III) chloride is used, considerable layer defects occur which can probably be attributed to the acid residue of the relevant salt. Chromium (III) chloride can thus be used to achieve the objective. Advantageously, the entire solution system is then specifically tailored thereto (type of pickling, inhibition, etc.).

Example 7: Effect of Chromium (III) Sulphonate in the Phosphate Solution on the Tensile Stress In order to demonstrate the advantages of the phosphate solution used in the method according to the invention, the following solutions were prepared.

TABLE 10

| Solution component | | Reference 1 | According to the invention 2 |
| --- | --- | --- | --- |
| Monoaluminium phosphate solution 50% | g | 150 | 150 |
| Silica sol 30% | g | 183 | 183 |
| Water | g | 40 | 40 |
| Diethylthiourea | g | 0.1 | 0.1 |
| Ethyl phosphate | g | 12.5 | 12.5 |
| Chromium (III) sulphonate | g | | 50 |

Figure 17:
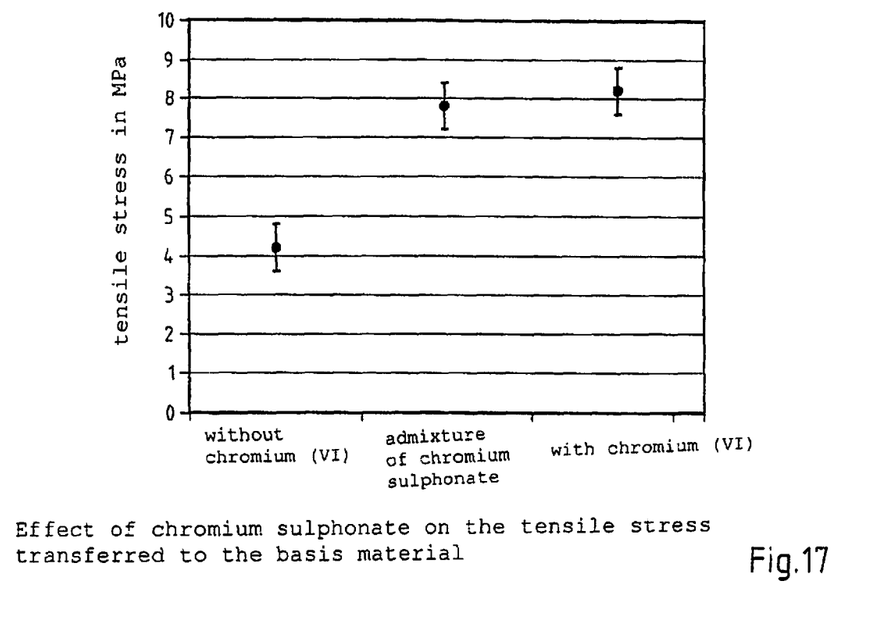

The solutions were applied to GO electric steel samples of the size 305 mm×60 mm and burnt-in at 850° C. for 2 minutes. The layer application in the burnt-in state was in all cases 3.5 g/m². Subsequently, the tensile stress test was carried out. FIG. 17 summarises the results.

We claim:

1. A method for producing a grain-orientated electric steel which is coated with a phosphate layer, the method comprising applying to the electric steel a phosphate solution, wherein the phosphate solution comprises:
    a phosphate component;
    a colloid component;
    a colloid stabilizer and a pickling inhibitor; and
    at least one compound comprising chromium (III), which is soluble in the phosphate solution,
    wherein the phosphate solution comprises less than about 0.2% by weight of hexavalent chromium, and
    wherein the phosphate solution has a pH of less than about 3, and
    wherein the colloid stabilizer comprises at least one of a phosphoric acid ester and a phosphonic acid ester, and
    wherein the pickling inhibitor is selected from the group consisting of a thiourea derivative, a C2-10-alkynol, a triazine derivative, thioglycolic acid, a C1-4-alkylamine, a hydroxy-C2-8-thiocarboxylic acid, a fatty alcohol polyglycol ether, diethylthiourea, prop-2-in-1-ol, butin-1,4-diol, hexamethylenetetramine, and any combination thereof.

2. The method of claim 1, wherein the compound comprising chromium (III) comprises a chromium (III) salt.

3. The method of claim 2, wherein the chromium (III) salt is selected from the group consisting of chromium (III) nitrate, chromium (III) chloride, chromium (III) sulphate, chromium (III) acetate, chromium (III) sulphonate, and any combination thereof.

4. The method of claim 1 wherein the compound comprising chromium (III) is present in a quantity selected from about 0.2% to about 30% by weight, from about 5% to about 20% by weight, or from about 8% to about 15% by weight, with respect to the overall weight of the phosphate solution.

5. The method of claim 1 wherein the phosphate solution comprises less than about 0.1% by weight of hexavalent chromium.

6. The method of claim 1, wherein the colloid stabilizer comprises a phosphoric acid ester.

7. The method of claim 1, wherein the phosphoric acid ester is selected from the group consisting of monoethylphosphate, diethylphosphate, and any combination thereof.

8. The method of claim 1, wherein the phosphate solution further comprises a wetting agent.

9. The method of claim 8, wherein the wetting agent comprises a fluorosurfactant.

10. The method of claim 9, wherein the fluorosurfactant comprises tetraethyl ammonium perfluorooctane sulphonate.

11. The method of claim 1, wherein the colloid stabilizer is present in a quantity of from about 0.001% to about 20% by weight with respect to the overall weight of the phosphate solution.

12. The method of claim 1, wherein the pickling inhibitor is present in a quantity of from about 0.001% to about 10% by weight with respect to the overall weight of the phosphate solution.

13. The method of claim 8, wherein the wetting agent is present in a quantity of from about 0.0001% to about 5% by weight with respect to the overall weight of the phosphate solution.

14. The method of claim 1, wherein the phosphate component comprises aluminum phosphate, magnesium phosphate, or a combination thereof.

15. The method of claim 1, wherein the phosphate solution has a pH of between about 1 and about 2.

16. The method of claim 1, further comprising burning the electric steel at a temperature of more than about 800° C.

17. A method for producing a grain-orientated electric steel which is coated with a phosphate layer, the method comprising applying to the electric steel a phosphate solution, wherein the phosphate solution comprises:
   a) aluminum phosphate, magnesium phosphate, or a combination thereof;
   b) colloidal silica dioxide;
   c) monoethylphosphate, diethylphosphate, or a combination thereof;
   d) a thiourea derivative, a $C_{2-10}$-alkynol, a triazine derivative, thioglycolic acid, a $C_{1-4}$-alkylamine, a hydroxy-$C_{2-8}$-thiocarboxylic acid, a fatty alcohol polyglycol ether diethylthiourea, prop-2-in-1-ol, butin-1,4-diol, hexamethylenetetramine, or any combination thereof;
   e) a fluorosurfactant; and
   f) a compound comprising chromium (III) which is soluble in the phosphate solution.

* * * * *

UNITED STATES PATENT AND TRADEMARK OFFICE
CERTIFICATE OF CORRECTION

PATENT NO. : 9,905,344 B2
APPLICATION NO. : 13/994446
DATED : February 27, 2018
INVENTOR(S) : Christof Holzapfel et al.

Page 1 of 1

It is certified that error appears in the above-identified patent and that said Letters Patent is hereby corrected as shown below:

On the Title Page

Under Inventors Item (75), "Stefan Pahike" should read --Stefan Pahlke--.

Signed and Sealed this
Eighteenth Day of June, 2019

Andrei Iancu
*Director of the United States Patent and Trademark Office*